United States Patent [19]

Casanellas Bassols

[11] Patent Number: 4,802,075
[45] Date of Patent: Jan. 31, 1989

[54] ELECTRONIC CIRCUITRY FOR CONVERTING DIRECT VOLTAGE TO ALTERNATING VOLTAGE

[76] Inventor: Francesc Casanellas Bassols, C. de la Torre, 7, 08006 Barcelona, Spain

[21] Appl. No.: 122,210

[22] Filed: Nov. 18, 1987

[30] Foreign Application Priority Data

Jan. 8, 1987 [ES] Spain ................................. 8700033

[51] Int. Cl.$^4$ .......................................... H02M 3/335
[52] U.S. Cl. ....................................... 363/16; 363/98; 363/131; 323/289
[58] Field of Search ...................... 363/16, 17, 97, 98, 363/131; 323/289; 307/270

[56] References Cited

FOREIGN PATENT DOCUMENTS 0087152 8/1978 Japan .................................. 363/131
0213283 12/1984 Japan .................................. 363/131

OTHER PUBLICATIONS

Koomen et al., "A Most Inverter with Improved Switching Speed", IEEE Journal of Solid-State Circuits, vol. SC-7, No. 3, Jun. (1972, pp. 231-237).

Primary Examiner—Peter S. Wong
Attorney, Agent, or Firm—Steinberg & Raskin

[57] ABSTRACT

The control for the MOSFET transistors (T1,T2) comprise two low voltage transistors (T4,T3), of which a first transistor (T4) has its base and collector respectively connected to the gate and drain of the direct voltage feed negative side MOSFET transistor (T2) to supply this latter transistor with the initial charge current for its drain, while the base and the emitter of the second low voltage transistor (T3) are connected to the ends of the blocking diode (D4) of the MOSFET transistor (T2) of the same negative side and to the gate of the MOSFET transistor (T1) of the positive side. The MOSFET transistor (T1) of the positive side remains in open condition when the command signal is positive, and shifts to conducting state when the command signal is null.

2 Claims, 1 Drawing Sheet

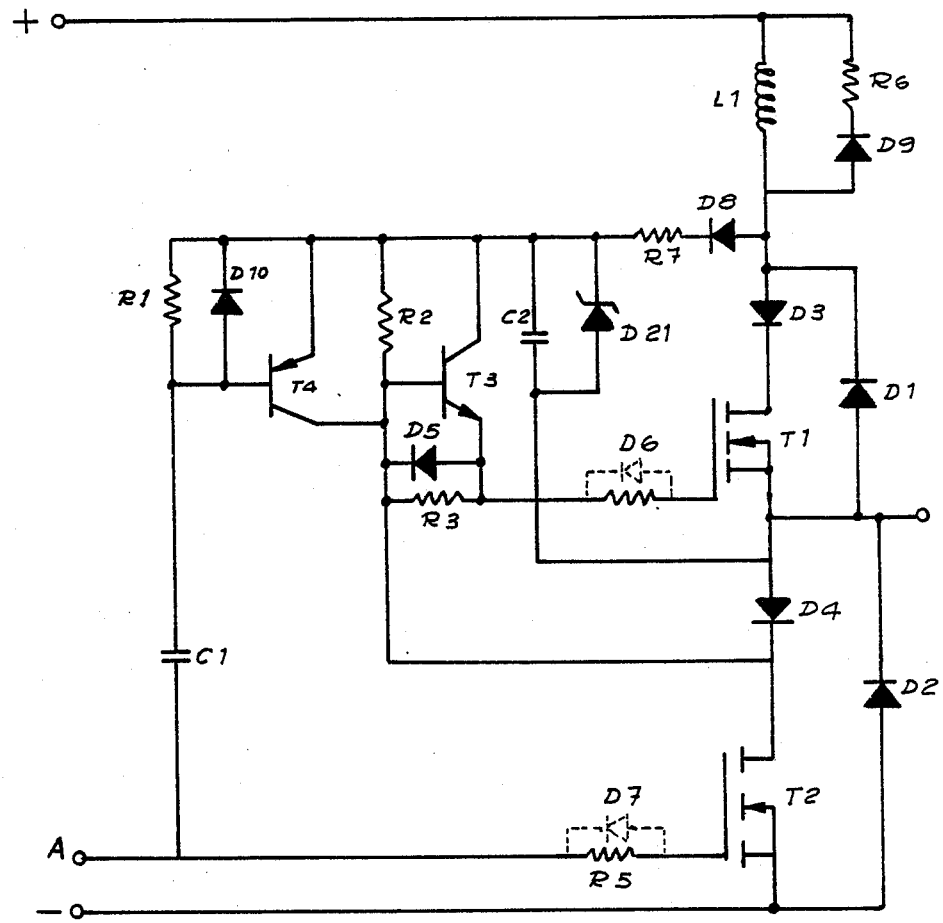

ELECTRONIC CIRCUITRY FOR CONVERTING DIRECT VOLTAGE TO ALTERNATING VOLTAGE

BACKGROUND OF THE INVENTION

The present invention relates to electronic circuitry for converting a direct voltage to monophase or polyphase alternating voltage for feeding a load, and, specifically, to the converter networks, also named inverter networks, intended for high voltages.

More specifically, the invention concerns the inverter networks based on the use of two MOSFET transistors.

Electronic inverter networks comprising two MOSFET transistors series connected with two respective blocking diodes, biased by two further respective diodes when the load is of an inductive nature, are well known, wherein the MOSFET transistor of the direct voltage feed positive side is governed through suitable control means.

For controlling MOSFET transistor, the following systems have been used hitherto:

1. Isolating the command signal by means of optoelectronic coupling devices;
2. Isolating the control signal by means of transformers which transmit the complete signal, the edges thereof or the high frequency modulated signal; and
3. Signal level change by means of a high voltage bipolar or MOSFET transistor.

SUMMARY OF THE INVENTION

The present invention solves the drawbacks related with the above systems through the use of low voltage transistors, of a very low cost, to control the MOSFET transistor of the positive side of the direct voltage feed.

The electronic network for converting a direct voltage to an alternating voltage making the subject of the invention is characterized in that the control means comprise two low voltage transistors, of which a first transistor has its base and collector connected respectively to the gate and drain of the MOSFET transistor of the negative side of the direct voltage feed to supply the drain charge initial current thereto, and the base and the emitter of the second low voltage transistor are connected to the ends of the blocking diode for the MOSFET transistor of the same negative side and to the gate of the positive side MOSFET transistor. The positive side MOSFET transistor remains in open condition when the command signal is positive, and shifts to conducting state when the said signal is null.

Advantageously the electronic network according to the invention further comprises a diode connected across the base and the emitter of the second low voltage transistor in order to hold the gate of the positive side MOSFET transistor at a low voltage.

With the electronic circuitry according to the invention, the drawbacks related with the above known systems can be eliminated since the cost of a network based on the use of low voltage transistors is low and the network configuration allows the sensibility to the sharp voltage variations to be dispensed with.

BRIEF DESCRIPTION OF THE DRAWINGS

For a better understanding of the above exposition, a drawing is enclosed wherein a practical diagrammatic embodiment is shown by way of a non-restrictive example.

In the drawing, the FIGURE shows a preferred embodiment of the electronic circuitry according to the invention.

DESCRIPTION OF A PREFERRED EMBODIMENT

The main MOSFET transistors T1 and T2 are of the growing type and n-channel. Diodes D3 and D4 are those usually employed to block the voltage of the above transistors during their non-conducting condition, while diodes D1 and D2 are those conventionally used in the cases where the load is of an inductive nature.

The command signal is applied to the terminal A and shifts directly by the transistor T2. The low voltage transistor T3 is commanded by the voltage across the terminals of the diode D4.

When the command signal is positive, the low voltage transistor is in conducting state, the diode D4 blocks low voltage transistor T3 and the gate of the MOSFET transistor T1 is held at a low voltage by means of diode D5 and resistor R3 (this resistor R3 is optional). Thus, the MOSFET transistor T1 is held in open or non-conducting state.

When the command signal is 0 and the low voltage transistor T2 is non conducting, no current flows through the diode D4, and resistor R2 makes low voltage transistor T3 conduct, thus holding the gate of the MOSFET transistor T1 at a positive level and, therefore, the transistor in conducting state.

The low voltage transistor T4 provides the initial charge current for the drain of the MOSFET transistor T2. This supplied charge is transmitted by the command signal through the capacitor C1 and muliplied by the gain of low voltage transistor T4.

As is already a common practice, diodes D6,D7 and resistors R4,R5 can be installed. A small inductance L1 (with the flywheel diode D9 and the optional ballast resistor R6) operates a current ballast during the time interval (tenths of a microsecond) in which the MOSFET transistors T1 and T2 are conducting together.

Components R7, D8, D21 and C2 illustrate one possible way for obtaining the auxiliary voltage for commanding the MOSFET transistor T1.

It is important to note the particular shifting arrangement of the low voltage transistor T3 and the diode D5 by the serial diode D4. Such an arrangement makes for the use of the low voltage and cost components featuring the invention.

I claim:

1. Electronic circuitry for converting a direct voltage to an alternating voltage, of the kind comprising two MOSFET transistors (T1, T2) series connected with respective blocking diodes (D3, D4) and biased by two further diodes (D1, D2) in the case of an inductive load, the MOSFET transistor (T1) of the direct voltage feed positive side (+) being commanded by control means responsive to a command signal, characterized in that the control means comprise two low voltage transistors (T4, T3) of which a first transistor (T4) has its base and collector respectively connected to the gate and drain of the MOSFET transistor (T2) of the direct voltage feed negative side (−), to supply this MOSFET transistor (T2) with the drain initial charge current, the base and the emitter of the second low voltage transistor (T3) being connected to ends of the blocking diode (D4) for the MOSFET transistor (T2) for the same negative side (−) of the direct voltage feed, and to the gate of the MOSFET transistor (T1) of the direct voltage feed positive side (+), the MOSFET transistor (T1) of the positive side being in open condition when the command signal is positive, and in conducting state when the command signal is null.

2. Electronic circuitry for converting a direct voltage to an alternating voltage, according to claim 1, characterized in that it further comprises another diode (D5) which is connected across the base and the emitter of the second low voltage transistor (T3) to hold the positive side MOSFET transistor (T1) gate at a low voltage.

* * * * *